US012709701B2

(12) United States Patent
Leermann et al.

(10) Patent No.: US 12,709,701 B2
(45) Date of Patent: Aug. 18, 2026

(54) ADHESIVE TAPE, IN PARTICULAR WRAPPING TAPE

(71) Applicants: Timo Leermann, Wuppertal (DE); Rene Rambusch, Wuppertal (DE)

(72) Inventors: Timo Leermann, Wuppertal (DE); Rene Rambusch, Wuppertal (DE)

(73) Assignee: CERTOPLAST TECHNISCHE KLEBEBAENDER GMBH, Wuppertal (DE)

( * ) Notice: Subject to any disclaimer, the term of this patent is extended or adjusted under 35 U.S.C. 154(b) by 40 days.

(21) Appl. No.: 18/526,850

(22) Filed: Dec. 1, 2023

(65) Prior Publication Data

US 2025/0109320 A1 Apr. 3, 2025

Related U.S. Application Data

(62) Division of application No. 17/292,436, filed as application No. PCT/EP2020/051581 on Jan. 23, 2020, now abandoned.

(51) Int. Cl.

| | |
|---|---|
| ***C09J 7/21*** | (2018.01) |
| ***C09J 5/00*** | (2006.01) |
| ***C09J 7/29*** | (2018.01) |
| ***C09J 7/35*** | (2018.01) |
| ***H01B 13/012*** | (2006.01) |
| *H02G 3/30* | (2006.01) |

(52) U.S. Cl.

CPC . *C09J 7/21* (2018.01); *C09J 5/00* (2013.01); *C09J 7/29* (2018.01); *C09J 7/35* (2018.01); *C09J 2203/302* (2013.01); *C09J 2301/304* (2020.08); *C09J 2400/263* (2013.01); *C09J 2421/00* (2013.01); *C09J 2423/00* (2013.01); *C09J 2423/046* (2013.01); *C09J 2423/106* (2013.01); *C09J 2425/006* (2013.01); *C09J 2427/006* (2013.01); *C09J 2429/006* (2013.01); *C09J 2433/00* (2013.01); *C09J 2467/006* (2013.01); *C09J 2471/00* (2013.01); *C09J 2475/00* (2013.01); *C09J 2475/006* (2013.01); *C09J 2483/00* (2013.01); *H01B 13/01263* (2013.01); *H02G 3/30* (2013.01)

(58) Field of Classification Search

CPC ......... C09J 7/21; C09J 5/00; C09J 7/29; C09J 7/35; C09J 2203/302; C09J 2301/304; C09J 2400/263; C09J 2421/00; C09J 2423/00; C09J 2423/046; C09J 2423/106; C09J 2425/006; C09J 2467/006; C09J 2471/00; C09J 2475/00; C09J 2475/006; C09J 2483/00; H01B 13/01263; H01B 13/01281; H02G 3/30

See application file for complete search history.

(56) References Cited

U.S. PATENT DOCUMENTS

2016/0272786 A1* 9/2016 Müssig .................... C08K 5/29
2020/0407599 A1* 12/2020 Leermann ................ C09J 7/385

* cited by examiner

*Primary Examiner* — George R Koch
*Assistant Examiner* — Christopher C Caillouet
(74) *Attorney, Agent, or Firm* — Andrew Wilford

(57) ABSTRACT

Hybrid fibers or filaments are extruded from a granulate mixture of bio-based polymers with petrochemical-based plastic polymers to form a textile substrate band and the band is then provided with an adhesive coating on at least one face of the substrate band to form an adhesive tape. This tape is then wound helically around a cable bundle to form a longitudinally extending wrap of the bundle and impart to the cable bundle an abrasion resistance of at least class C according to LV 319 (2009).

9 Claims, No Drawings

ADHESIVE TAPE, IN PARTICULAR WRAPPING TAPE

CROSS REFERENCE TO RELATED APPLICATIONS

This application is a division of application Ser. No. 17/292,436 filed 10 May 2021 as the US-national phase of PCT/EP2020/051581 published 6 Aug. 2020 as WO 2020/156912 claiming the priority of German application 20 2019 100 588.2 itself filed 31 Jan. 2019.

FIELD OF THE INVENTION

The invention relates to an adhesive tape, in particular tape for wrapping cables in automobiles having a textile substrate band and an adhesive coating on at least one face of the substrate band.

BACKGROUND OF THE INVENTION

Adhesive tapes and, in particular, wrapping tapes for wrapping or sheathing cables in automobiles must meet many requirements. First of all, there must be special media resistance to, for example, oil and gasoline. High temperature resistance is also required. In fact, such winding tapes should typically be usable between −50 E or −40 Ec up to +150 Ec and more. In addition, there should be low noise emissions, in that for example rattling noises from a wrapped cable harness or cable bundles are prevented as much as possible.

In addition to these requirements described above, high abrasion resistance is also required. Wearing through from friction against the vehicle body must be prevented. The abrasion resistance can be based on the LV 312 standard (2009) that is based on abrasion classes and that determines the classification of adhesive tape.

In addition to the requirements described, it must be possible to manually tear the adhesive tape or wrapping tape in question. Because the wrapping tapes in question are typically used by an assembly worker who makes up cable bundles by spiral or helically winding the tape and then cutting it to length. The easiest way to do this is to simply tear it off. Basically such adhesive tapes and in particular winding tapes serve for sheathing of cables as a longitudinal casing for use in automobiles according to the invention.

An adhesive tape of the structure described above with a textile substrate band or fabric substrate band is seen for example in DE 20 2018 103 986 of applicant. Comparable adhesive tapes with a multilayer structure of the substrate band are the subject of DE 20 2018 101 383 [US 2021/0002519] or DE 20 2018 101 168 [US 2021/0079268].

In recent times, more and more technical devices and especially automobiles and consequently also equipment built into them and built-in parts require to a not inconsiderable degree such adhesive tapes and in particular wrapping tapes for wrapping of vehicular cables satisfying requirements for improved recyclability and in particular energy-efficient manufacture. Since nowadays cable sets in automobiles hold several kilometers of copper wires, and the consumption has also increased accordingly for winding tapes for making up the cable trees much more than in the past. This is why energy-efficient manufacture now has such special importance.

In the prior art, for example, DE 20 2017 106 797 describes films and especially protective films that are partly made of a bio-based polymer. The bio-based polymer, in turn, is comprised of or obtained from a plant-based raw material.

Comparable approaches are seen in EP 2 190 909 [US 2011/0097528] that deals with packaging parts by thermoshaping flat sheet plastic. Similar subject matter is found in US 2011/0152453 or WO 2013/131158. Finally, in this context, reference should also be made to EP 2 307 465 [U.S. Pat. No. 9,045,577] that deals with the manufacture of a grafted polymer through fermentation of renewable raw materials.

The state of the art has basically proven itself, with regard to the deployment and use of biopolymers for in particular foils or packaging material. However, so far it is missing resilient approaches to the use of such adhesive tapes and in particular wrapping tapes for wrapping cables in automobiles to be produced in a resource-saving manner. This is where the invention wants overall remedy.

OBJECT OF THE INVENTION

The object of the invention is to provide such an adhesive tape and in particular wrapping tape for wrapping cables in automobiles to that can be manufacture while conserving resources.

SUMMARY OF THE INVENTION

The object of the invention is attained by use of a generic adhesive tape in that according to the invention the textile substrate band is made at least partially with recourse to bio-based polymers. At least partial recourse to bio-based polymers means that the mass fraction of these bio-based polymers in the substrate band is at least 5% by mass. In this case at least this 5% by mass is made from the bio-based polymer material are based on renewable natural resources. Both resources for such bio-based polymers or colloquially "bioplastics" are derived from raw materials above all comprised of starch and cellulose as biopolymers of sugars. In fact, these bio-based polymers can according to the invention for example be mixed with synthetic-resins and used for manufacture of the substrate band, and these last-mentioned synthetic-resins are those based on petrochemical raw materials and their by-products. This contrasts with the bio-based polymers natural resources that are used.

As a rule, these natural resources for the bio-based polymers are based on renewable raw vegetable materials. The starting material starchy plants such as maize or sugar beet as well as wood from which cellulose can be obtained, has proven to be beneficial. Further possibilities for production use are plants such as sugar cane, sugar beet, corn, grain, barley, potatoes, sugar palm, cassava, algae, maple, agava, and potatoes, to name but a few. Basically there are also bio-based polymers with lactic acid, so-called polylactides. These arise from the polymerization of lactic acid, which in turn is a product of fermentation from sugar and starch by lactic-acid bacteria.

In any case, the bio-based polymers can be replaced by natural as well as renewable raw materials with practically infinite availability, whereas the synthetic-resins come from limited petrochemical resources. To make the adhesive tape according to the invention wile conserving resources, the invention recommends the at least partial recourse to bio-based polymers, namely in the substrate band with a mass fraction of at least 5% by mass. The remaining one mass fraction of up to 95% by mass is in this context formed by synthetic-resin polymers.

SPECIFIC DESCRIPTION OF THE INVENTION

For a particularly advantageous and resource-saving variant, the procedure is such that the textile substrate band is completely or almost entirely made from bio-based polymers with an associated mass fraction of up to 100% by mass. The above-described mixture of bio-based polymers and of course, synthetic-resins also include embodiments in which the textile substrate band is, for example, completely made from the bio-based polymers also has for example a film coating on one or both faces. This also includes multilayer substrate bands, in which, for example, one textile substrate band is of bio-based polymers and the other textile substrate band is made of synthetic-resin polymers. This explains the various conceivable hybrid forms and also the automatically resulting different mass fractions.

That is to say, the substrate band can be formed by a monolayer substrate band or as a single layer. In the context of the invention, however, the textile substrate band can also be a multilayer laminate. In this way, at least the abrasion class B according to LV 312 (2009) is attained. Abrasion class B means that the tape in question can be stressed by a 5 mm mandrel taking into account a weight load by at least 100 strokes of 10 N until it is worn through, as described for example in DE 20 2012 103 975 [U.S. Pat. No. 10,351,734]. At least abrasion Class C is preferably reached.

For this purpose, the adhesive tape or the substrate band has a surface density in the range from 20 g/m$^2$ to 500 g/m$^2$. A range from 50 g/m$^2$ to 200 g/m$^2$ for the surface weight of the substrate band is preferred. The material thickness of the substrate band is mostly below 0.8 mm. A thickness of the substrate band of less than 0.5 mm is preferred.

The adhesive coating that is generally applied in an application weight in the range of approx. 20 g/m$^2$ to 200 g/m$^2$ and in particular in the range from about 50 g/m$^2$ to 150 g/m$^2$. These have proven to be suitable adhesives based on a synthetic rubber adhesive, hot-melt adhesive or those based on acrylate (with or without solvents) as special proven favorable. Adhesives of silicone, polyurethane, polyether and polyolefin base are conceivable. The adhesives in question can be used after coating if necessary.

The adhesive coating as such can be applied over the entire area of at least one face of the substrate band. But it is just as good to apply the coating as one or more stripes on one of faces of the substrate band. In addition, adhesives in powder form, dispersion adhesives or in general solvent-based adhesives are conceivable. The adhesive or the adhesive coating is generally applied as a so-called direct coating worked on a contact basis. In addition, there is a transfer coating or also contactless coating according to the "curtain coating" method conceivable.

The textile substrate band is generally made of bio-based polymer fibers and/or threads. The bio-based polymer fibers are for example staple fibers, that is to say fibers of finite length. But they can also be continuous filaments, that form the textile substrate band. In addition, bio-based multifilament threads are also conceivable and are also included, i.e. those made up of several continuous fibers or filaments. The fineness of the polymer filaments/fibers may be in the range from 10 dtex to several 100 dtex. Typical thread counts are in the range from 10 threads/cm to 50 threads/cm for one fabric.

The individual fibers or continuous filaments are regularly produced by extrusion. It is also conceivable to color code the fibers or filaments in the extrusion process by addition of color pigments. Also mixed forms of shape can be realized by extruding from granules bio-based polymers with synthetic-resins petrochemical basis that are mixed and in this way quasi hybrid fibers or filaments are produced. In this case, the textile substrate band produced in this way also meets requirements, namely at least partially based on bio-based polymers with a mass fraction in the substrate band of at least 5% by mass.

The bio-based polymers are preferably bio-based polyethylene (PE). But it is also possible, other bio-based polymers such as polylactides (PLA), polyesters of the type PHA (polyhydroxyalkanoate), cellulose materials made from chemically modified cellulose, PVC (polyvinyl chloride) from bioethanol or for example to use a sugar cane base. Likewise a bioethanol base, for example from sugar cane polypropylene or bio-polypropylene (PP) can be used in the same way as bio-polyethylene. In addition, specific polyamides (PA) are also conceivable that can be produced from castor oil, for example. Also specific polyester such as PDO (bio-propanediol) is conceivable. Furthermore, other bio-based polymers such as for example PS (polystyrene), PVA (polyvinyl acetate), PA (polyamide) and polyurethane are possible. Likewise, of course, any combinations are covered by the invention.

Suitable textile substrate band is, for example, have proven to be fleece, knitted fabrics, woven fabrics or combinations have proven to be beneficial. In principle, there are also hybrid forms, for example the textile substrate band is multilayered as a combination weave/fleece or weave/weave or weave/knit. The textile substrate band can also be solid, as is known for nonwoven-based supports. Customary consolidation methods such as chemical and/or physical consolidation are used. In the case of chemical bonding, the fleece is additionally solidified with a binder. The physical consolidation uses needling, for example, which can also be done with the help of water jets. In addition, the fleece in question can also be calendered.

Overall, the invention is based on the discovery that it so far it was not considered possible that bio-based polymers cannot just be extruded into films or packaging, but also fibers or threads extruded in this manner can in turn be used as a basis for textile substrate bands of appropriately structured adhesive tapes. In fact, the invention takes up in this context so-called "drop-in bioplastics," that is, bio-based polymers whose chemical structure is more familiar with those of conventional identical synthetic resins. These only include examples like bio-based PE (polyethylene) or bio-based PET (polyethylene terephthalate). The basic building blocks of these bio-based polymers are made from renewable raw materials instead of petroleum, as has already been explained above. Due to the identical chemical structure, for the further processing into end products and consequently also into the in the adhesive tapes described in this context, one can use the same machines and processes as for previously realized synthetic-resins or fossil-based counterparts.

For example, a mass-produced plastic such as PET (polyethylene terephthalate) is used by polycondensation of monoethylene glycol (or ethylene glycol) and theraphthalic acid. So far, only partially bio-based PET has been proposed, in which the monoethylene glycol (about 30 wt. %) is derived from sugar cane. The theraphthalic acid has so far been mainly made from petrochemicals.

In the meantime, however, the theraphthalic acid can also be used economically in a bio-based process, so that in the future too the mass market can be served economically. This is where the main advantages can be seen.

The invention claimed is:

1. A method comprising the steps of:

extruding hybrid fibers or filaments from a granulate mixture of bio-based polyethylene terephthalate with petrochemical-based plastic polymers to form a textile substrate band;

providing an adhesive coating on at least one face of the substrate band to form an adhesive tape; and winding the adhesive tape helically around a cable bundle to longitudinally wrap the bundle and impart to the cable bundle an abrasion resistance of at least class C according to LV 319 (2009).

2. The method according to claim 1, wherein the filaments or fibers are of a mass fraction in the band of at least 5% by mass of bio-based polyethylene terephthalate.

3. The method according to claim 1, wherein the polymer fibers and/or filaments form a nonwoven, a knitted fabric, a woven fabric or a combination thereof.

4. The method according to claim 1, wherein the textile substrate band is formed as a single layer.

5. The method according to claim 1, wherein the textile substrate band is a multilayer laminate.

6. The method according to claim 1, wherein the substrate band has a surface weight of 20 $g/m^2$ to 500 $g/m^2$.

7. The method according to claim 1, wherein a thickness of the substrate band is less than 0.8 mm.

8. The method according to claim 1, wherein the adhesive coating has an application weight of 20 $g/m^2$ to 200 $g/m^2$.

9. The method according to claim 1, wherein the adhesive coating is a synthetic-rubber adhesive, a hot-melt adhesive, an acrylic-based adhesive, or has a silicone, polyurethane, polyether and/or polyolefin base.

* * * * *